(12) United States Patent
Schmitt et al.

(10) Patent No.: US 6,831,288 B1
(45) Date of Patent: Dec. 14, 2004

(54) LIGHT-SENSITIVE SENSOR UNIT, ESPECIALLY FOR AUTOMATIC SWITCHING OF ILLUMINATION EQUIPMENT

(75) Inventors: Patrick Schmitt, Lichtenau (DE); Norbert Hog, Buehl (DE); Andreas Gille, Buehl (DE); Bruno Hodapp, Achern-Oensbach (DE); Gebhard Michenfelder, Lichtenau (DE); Rainer Pientka, Renchen (DE); Hans Meier, Ottersweier (DE); Henry Blitzke, Buehl (DE); Manfred Burkart, Iffezheim (DE)

(73) Assignee: Robert Bosch GmbH, Stuttgart (DE)

(*) Notice: Subject to any disclaimer, the term of this patent is extended or adjusted under 35 U.S.C. 154(b) by 90 days.

(21) Appl. No.: 10/149,824
(22) PCT Filed: Jul. 14, 2000
(86) PCT No.: PCT/DE00/02344
§ 371 (c)(1), (2), (4) Date: Mar. 26, 2003
(87) PCT Pub. No.: WO01/05626
PCT Pub. Date: Jan. 25, 2001

(30) Foreign Application Priority Data

Jul. 17, 1999 (DE) .......................... 199 33 642
Jul. 17, 1999 (DE) .......................... 199 33 641

(51) Int. Cl.$^7$ .................................................. H01J 5/16
(52) U.S. Cl. .................. 250/573; 250/227.25; 250/239; 318/483
(58) Field of Search ................................ 250/573, 574, 250/227.25, 208.1, 239; 318/483, DIG. 2, 444; 340/601, 602; 362/494, 503; 315/159

(56) References Cited

U.S. PATENT DOCUMENTS 6,614,043 B2 * 9/2003 Hochstein .................... 250/573
2004/0080275 A1 * 4/2004 Schmitt et al. ............. 315/159

FOREIGN PATENT DOCUMENTS

| DE | 195 23 262 | 1/1997 |
| DE | 197 04 818 | 8/1997 |
| DE | 196 30 216 | 1/1998 |
| DE | 198 39 273 | 9/1999 |
| JP | 58 089 430 | 5/1983 |

* cited by examiner

Primary Examiner—Kevin Pyo
(74) Attorney, Agent, or Firm—Kenyon & Kenyon

(57) ABSTRACT

Light-sensitive sensor unit, especially for the automatic switching of illuminating equipment, preferably in motor vehicles, which includes at least two light-sensitive sensors, at least a first sensor and a second sensor detecting the light conditions in predetermined directions. For this purpose, all light-conducting elements allocated to the sensors are to be connected in one piece as a light-conducting member and integrated into the light-conducting member of a rain sensor.

33 Claims, 4 Drawing Sheets

LIGHT-SENSITIVE SENSOR UNIT, ESPECIALLY FOR AUTOMATIC SWITCHING OF ILLUMINATION EQUIPMENT

FIELD OF THE INVENTION

The present invention relates to a light-sensitive sensor unit, especially for automatic switching of illuminating equipment in vehicles.

BACKGROUND INFORMATION

A sensor unit is discussed in German Published Patent Application No. 195 23 262, which includes a global sensor and a directional sensor by which the light conditions outside the vehicle are determined. The sensor unit is connected to the evaluation device in which, from the signals of the sensor unit, it is ascertained whether, with the actually present light conditions in the surroundings of the vehicle, a change in the switching state of the illuminating equipment is necessary. This sensor unit permits automatic switching of the illuminating equipment, but because of the global and directional technology, it includes relatively many parts, which makes for considerable costs as well as costly adjustment.

SUMMARY OF THE INVENTION

The equipment according to an exemplary embodiment of the present invention may have the advantage that, by the integration of global and directional technology, a simple, compact, robust, easy-to-install and practically adjustment-free sensor unit may be made available. In addition, the equipment may include only a minimal number of component parts, which may make possible simple and cost-effective production with broadened functionality. Since components which hinder vision may be held to a minimum on windshields of motor vehicles, the small dimensions made possible by the integration of the global and directional technology may turn out to be an additional great advantage. By the integration of the light-conducting element of the sensor unit into the light-conducting element of a rain sensor device, further component parts may be saved, and the number of visually impairing components on the windshield may be even further reduced.

Further work steps may be saved especially when the light conducting element may be manufactured by a multi-component injection molding process together with the light-conducting element of the rain sensor and the coupling medium.

Because at least three sensors may detect light from predetermined directions, a broad region in front of the vehicle may be covered.

If one sensor is positioned in the driving direction and two further sensors are positioned tilted at an angle $\alpha$ to each side of the driving direction, this may yield a broad detecting cone in front of the vehicle, so that tunnel entrances, which are not yet in the driving direction, may be detected, and the illuminating equipment may be appropriately controlled.

If the directional sensors have lens-like elements which may also overlap with one another, the detecting cone may be matched individually to the instructions of the vehicle manufacturer.

If the light conducting elements are integrally formed, further construction space may be saved, and the sensor unit may be further minimized.

If the sensor elements are able to distinguish between daylight and artificial light, it may be prevented that the illuminating equipment is shut off at bright illumination while driving in a tunnel.

The sensor unit according to an exemplary embodiment of the present invention may provide a substantial improvement of the response behavior of the rain sensor device, which may come about through the increase in the relationship of the sensitive surface to the contact surface, as compared to the usual rain sensors. This may be achieved by a trapeze-shaped arrangement of transmitter and receiver. Because of the oblong, coherent area, the probability may be increased that a raindrop located on the windshield will drift onto the sensitive area because of the wind generated by travel of the vehicle, which may result in an improvement of the response behavior.

By using several receivers per transmitter, the number of measured paths, and thus the number of sensitive areas may be increased, which may yield a further cost advantage.

The same effect may appear when several transmitters and only one receiver are used. If two transmitters and one receiver are used, four measured paths and thus four sensitive areas may be achieved. If the distance between the two transmitters is about twice as large as the distance between the two receivers, this may yield an especially uniform arrangement of the sensitive areas.

It may further prove advantageous to fasten the rain sensor device on the windshield in such a way that the installation position of the transmitters is on the lower parallel of the trapeze and that of the receivers on the upper parallel. Exposure to sunlight, which may preferably come from above and which may represent disturbing outside light, may thus be minimized on the receivers.

Because of the improved properties, and possibly particularly because of the improved ratio of sensitive area to contact surface, the contact surface of the sensor may be reduced, whereby the outer dimensions of the sensor on the windshield may be reduced. In this connection it may be particularly advantageous that, because of the trapeze-shaped arrangement of the transmitters and receivers, the outer dimensions of the sensor housing may nevertheless be selected to be rectangular, so that the surface area, under optimal utilization of the contact surface of the light-conducting member, may be arranged in it. A rectangular contact surface or housing additionally may have a cost-reducing effect during manufacturing. The smaller contact surface of the light-conducting member may represent an installation advantage, since with a constant contact force, the contact pressure may rise, and thereby a disturbing formation of bubbles between the coupling medium and the windshield may be avoided. In this situation it may also be possible to partially increase the surface pressure in a targeted way, by a gentle curvature of the surface, facing the windshield, of the light-conducting member at the light-entering and/or light-exiting surfaces.

It may also prove advantageous if an exemplary embodiment that in the arrangement in each case two transmitters or two receivers are positioned on the opposing parallel sides. Since, however, four measured paths, i.e. four sensitive surfaces of the sensor, may be realized each by two transmitters and two receivers, a substantial cost advantage may come about.

DETAILED DESCRIPTION

Figure 1:
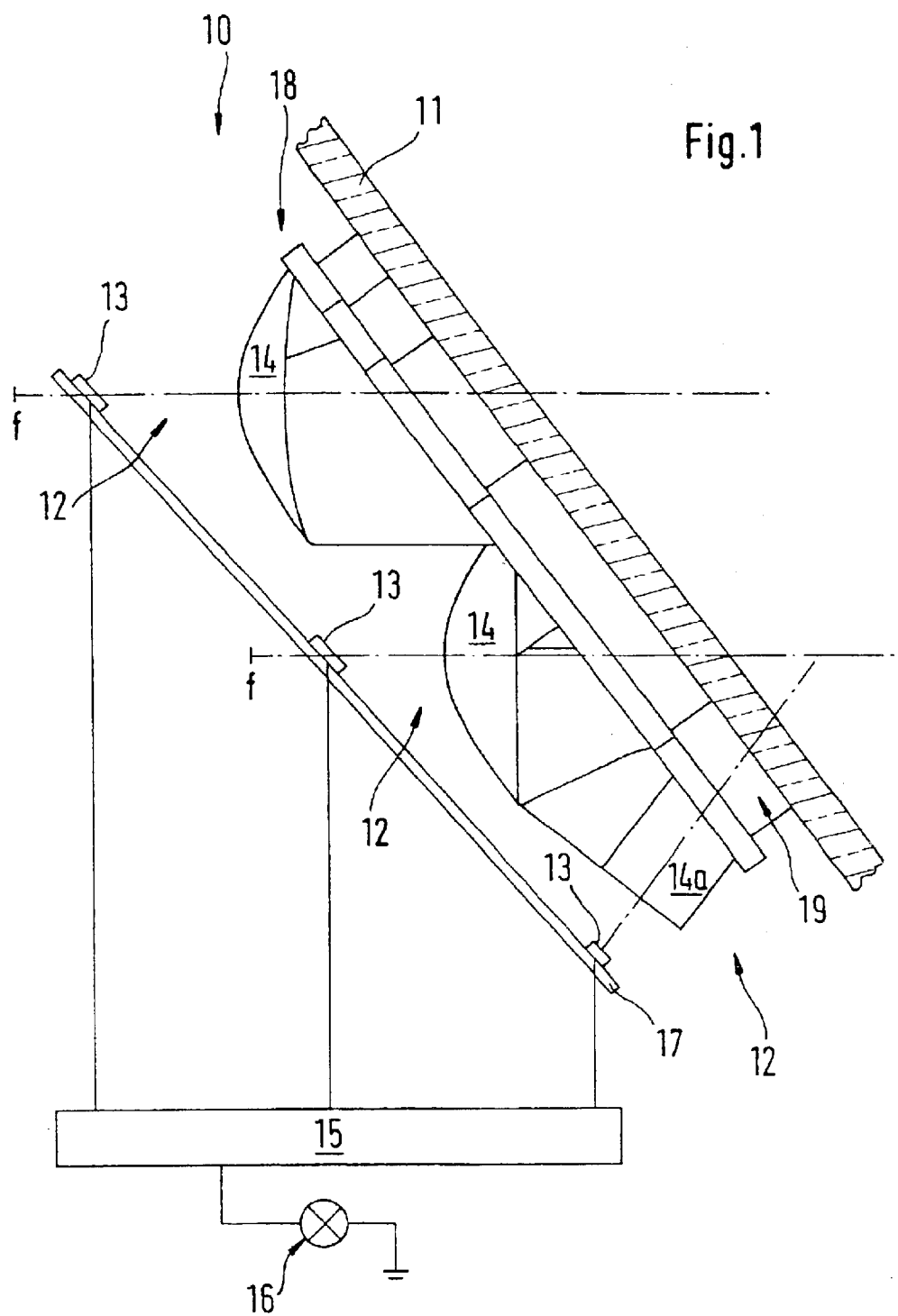
FIG. 1 shows a section through a sensor unit according to an exemplary embodiment of the present invention.

FIG. 1 shows a sensor unit 10 according to an exemplary embodiment of the present invention which may be attached to a pane 11, which may be a windshield of a motor vehicle. Sensor unit 10 may be made up of several sensors 12, and each sensor 12 may include a sensor element 13 and a light-conducting element 14, 14a. In this instance, however, two light-conducting elements 14 may use one sensor element 13 in common, so that three light-sensitive sensor elements 13 may be established with four light-conducting elements 14 and 14a. The light-conducting member, on which light-conducting elements 14, 14a may be mounted, may be made up of an at least partially light-permeable plate having cylindrical protuberances, which may be closed off with lens-shaped curvatures. Together with the lens-shaped curvatures, these cylindrical protuberances may each form a light-conducting element 14, 14a. If parallel light along the center axis of the cylindrical protuberances passes through the lens-shaped curvatures, this may yield a focal point f which may characterize a focal length of the light-conducting element 14, 14a.

Sensor elements 13 may each be positioned between focal points f of light-conducting elements 14 and the light-conducting elements 14 themselves. This may yield light detection cones facing ahead in the driving direction which may permit detection in predetermined directions. The angular aperture of the light detection cone may be set via the distance between focal point f of each appertaining light-conducting element 14 and light-sensitive sensor elements 13.

An evaluation device 15 may control the switching of an illuminating device 16 as a function of the signals from sensor elements 13. Sensor elements 13 may all be jointly mounted on one circuit board 17, and may be designed so that they may distinguish between daylight and artificial light, so as to prevent switching-off by artificial light illumination, for instance in a tunnel. This may be put into effect by appropriate choice of the sensitivity range of sensor elements 13. It may also be possible to select the sensitivity range in such a way that certain spectral ranges or characteristic lines, such as those of gas-discharge lamps, are recognized, thus making possible control by distant light and dimmed light in a motor vehicle.

Besides this directional sensor technology, at least one light-conducting element 14a may be aligned forwards, not necessarily in the driving direction. The light-detecting cone of this at least one light-conducting element 14a may have a very large angular aperture, and may detect the global light conditions outside the vehicle.

All light-conducting elements 14, 14a, in particular also the sensors of the directional technology and the global technology, may be connected as one piece to light-conducting member 18. This light-conducting member 18 may be made, for example, as an extruded part of clear or UV-permeable plastic. It may also be possible to fabricate light-conducting member 18 of dyed or coated plastic, which may have as a property a possibly desired filter action for influencing the sensitivity range of the sensor. This light-conducting member may be pressed onto the pane via a coupling medium 19, such as a silicone pad. Coupling medium 19 may prevent air occlusion between pane 11 and light-conducting member 18, which may cause undesired scattering. It may be further possible to mount coupling medium 19 directly on light conducting member 18 during its production, in a multi-component injection molding process.

This light-conducting member 18 may be an integral component of a light-conducting member 110 of a rain sensor set-up.

Figure 2:
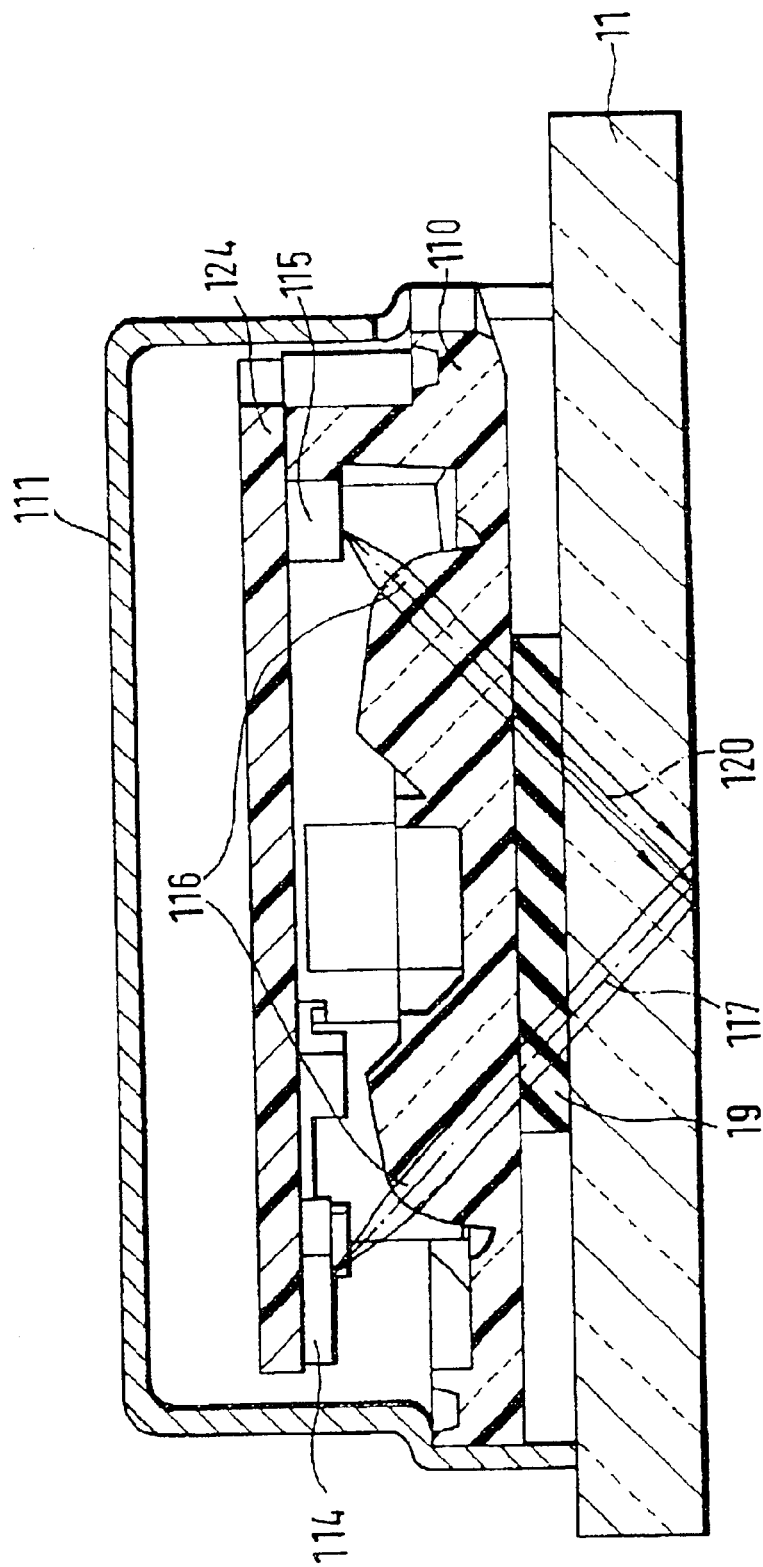
FIG. 2 shows a representation of an exemplary embodiment of the sensor unit integrated into a light-conducting element of a rain sensor in perspective.

FIG. 2 shows a light-conducting member 110 of a rain sensor set-up, shown in section, having a sensor housing 111. The contact surface of light-conducting member 110 may be given, for example, by its contact via coupling medium 19, such as a silicone pad, with pane 11. All in all, the outer dimensions of light-conducting member 110 may correspond approximately to the length and width dimensions of the sensor unit, but sensor housing 111 may also bulbously surmount the contacted contact surface of light-conducting member 110 on pane 11, and therein accommodate various elements of the sensor unit, especially transmitter 114 and receiver 115, as well as a circuit board 124.

The sensor unit may, for instance, be fastened to the inside of pane 11, such as the windshield of a motor vehicle. The fastening of sensor housing 111 to pane 11 is not shown. Light-conducting member 110 or sensor housing 111 may be fastened to pane 11 by pressing, light-conducting member 110 may characteristically have the function of coupling into pane 11 transmitter light 117 transmitted by a transmitter 114, and of coupling out transmitter light 120, deflected by total reflection or reflection, at another predetermined location to a receiver 115. This may happen here at optical elements 116, which may be fastened, and which may be attached to the light-conducting member as lenses, and which may bundle, bend or deflect the rays of transmitter light 117, 120 in the desired direction.

In the sectional plane shown, above light-conducting member 110 at least one light-emitting transmitter 114 and a light-detecting receiver 115 may be fastened inside sensor housing 111. Light-emitting diodes (LED) may be used as transmitters, and light-detecting diodes (LRD) may be used as receivers. The transmitter radiation of the light may lie in the infrared (IR) or in the visual range (VIS), but other frequency ranges are also possible. A receiver element similar to a light diode in its design may also be used as a receiver, whereby an optimal frequency matching between transmitter 114 and receiver 115 may be achieved. The material of light-conducting member 110 may be a plastic, and may be transparent to the transmitting frequency of the light-emitting diodes (LED), and may be opaque to interfering extraneous light.

Figure 3:
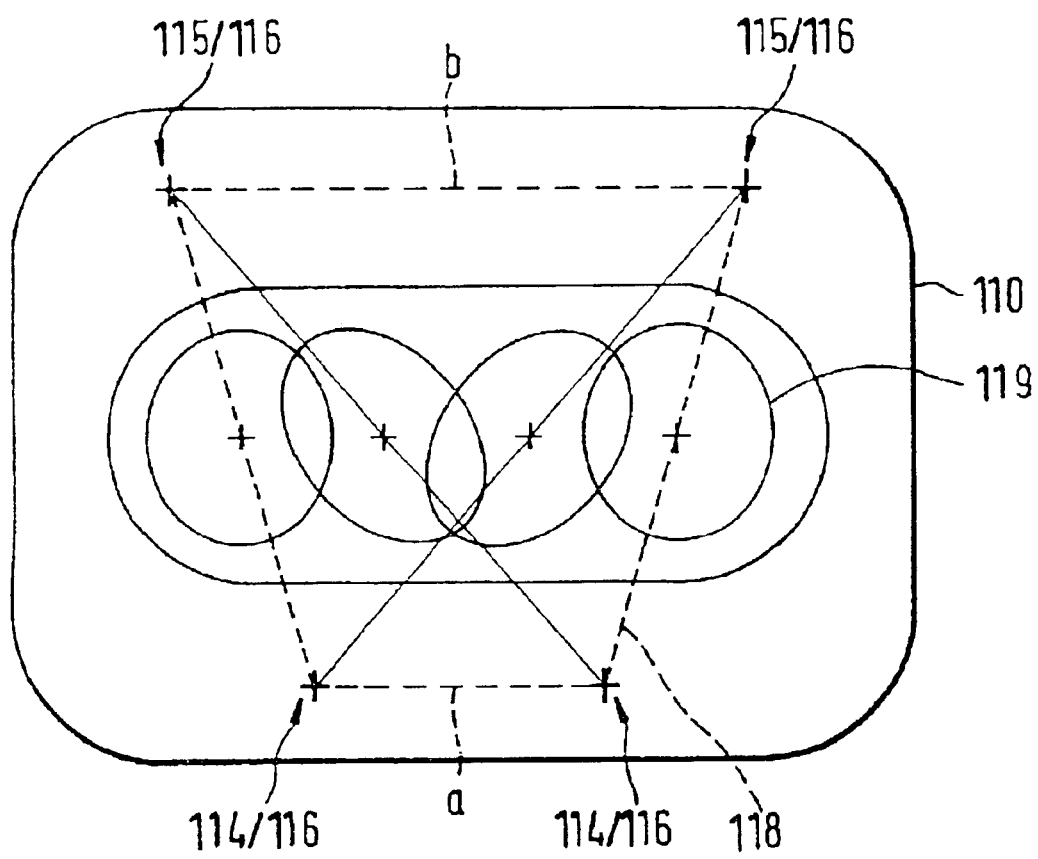
FIG. 3 shows a schematic drawing of the contours of an exemplary embodiment of the rain sensor arrangement.

In FIG. 3 a possible positioning of transmitter 114 and receiver 115 may be seen. Transmitters 114 and receivers 115 of the sensor unit may be placed near optical elements 116 of FIG. 2. Transmitter 114, receiver 115 and respectively appertaining optical elements 116 may define a base area 118 indicated by a dotted line, which may correspond to a trapezium.

On a first parallel of the trapezium, two optical elements 116 are positioned each near a transmitter 114. Because the optical elements 116 are here designed in each case as two lenses arranged next to each other, there may follow for each transmitter 114 two measured paths in two directions. Receivers 115 may be positioned analogously. Optical elements 116 are made, for instance, of lenses or mirrors which may also be integrally formed. A solution using in each case only one lens may be possible, since by an appropriate choice of distances a and b of trapezoidal base area 118 the error angles created may be kept low.

Distances a and b between transmitters 114 and receivers 115 may be determined by the wavelength of the emitting radiation of transmitter 114, the thickness of pane 11 and light-conducting member 110, the index of refraction of pane 11, the angle of incidence and the position of incidence of transmitter light 117 into pane 11. The distances may be picked so that the radiation of transmitter light 117 coupled into pane 11 is totally reflected one time for each measured path at the outlying surface of pane 11, and may subsequently be coupled out of pane 11 and guided to receiver 115.

The sketched sensitive surface 119 may correspond to the areas on the wettable side of pane 11 at which the total reflection of the radiation of transmitter light 117 may take place when pane 11 is not wetted. Depending on the arrangement of transmitters 114 and receiver 115 with respect to pane 11, the thickness of pane 11 and the shape of optical element 116, the reflection surfaces of transmitter light 117 may have a certain diameter. However, the parameters named should be so large, according to the present invention, that an almost coherent sensitive surface 119 may be created. According to the present invention, this may be achieved by having the intersection of the center axes of radiation cone 120 of transmitter 114 lie on a straight line with the wettable side of pane 11 at about the same distance.

In case more than one total reflection is desired at the wettable outer side of pane 11, the distance a or b, of transmitters 114 and receivers 115 or optical elements 116 appertaining to them in each case, may be chosen correspondingly larger, and coupling medium 19 may be attached only at the coupling in and coupling out areas of the light at pane 11.

Figure 4:
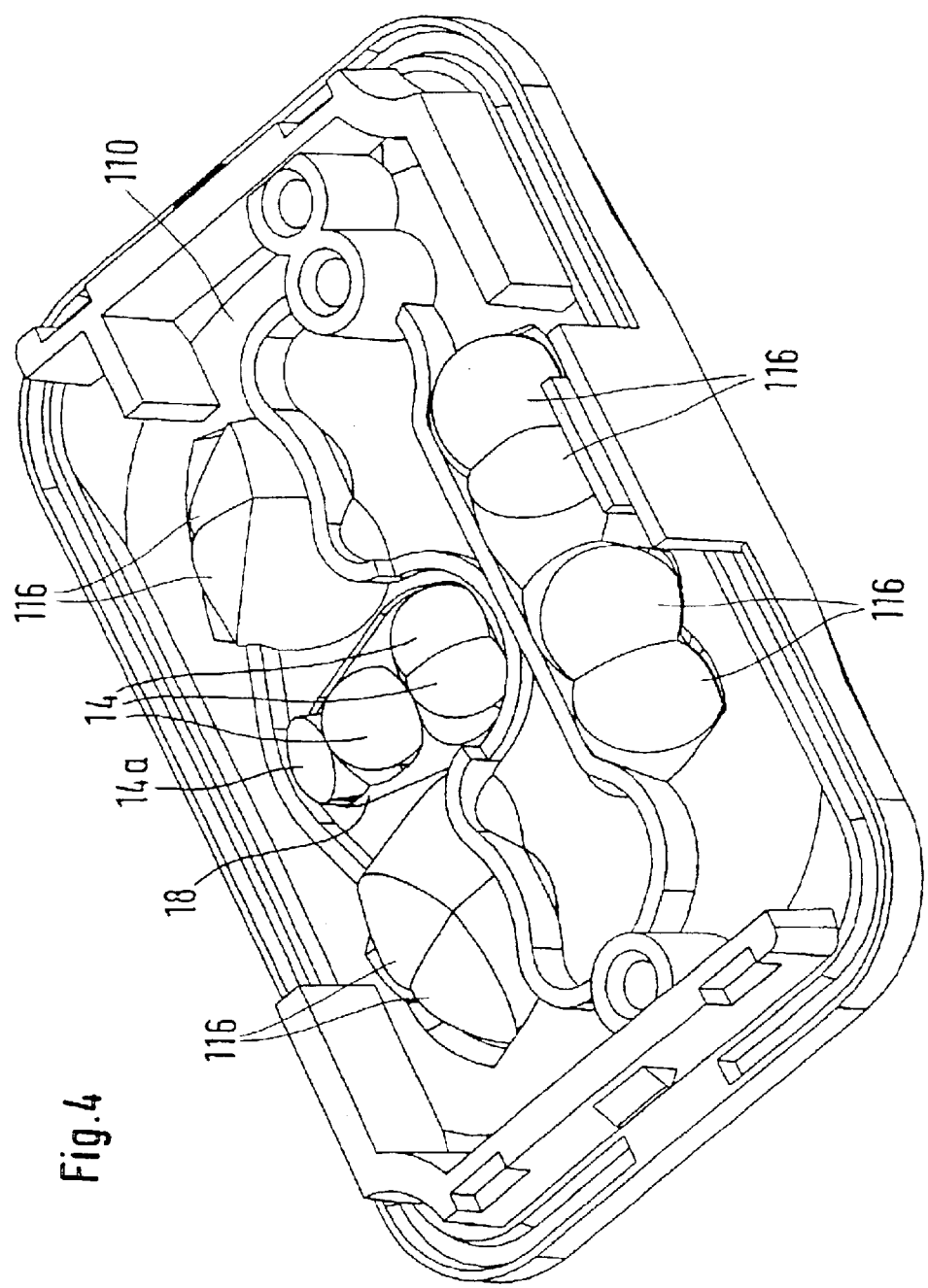
FIG. 4 shows a light-conducting member of the sensor unit as in FIG. 2, according to the present invention.

FIG. 4 shows light-conducting member 110 of the sensor unit as in FIG. 2, according to the present invention. Since the trapezium made up of transmitters 114 and receivers 115 may include a shorter and a longer parallel, light-conducting member 18 of sensor unit 10 may be positioned for automatic light control of the motor vehicle, and may be displaced a little away from the center in the direction of the longer parallel. This light-conducting member 18 may be produced from a light-permeable material, whose transparency range may lie in the visual range.

Light-conducting member 110 and light-conducting member 18 may be produced in one part, for instance in a multi-component injection molding process, but a design using several individual parts may also be possible, in that case light-conducting member 18 may be set into a corresponding recess in light-conducting member 110.

Plexiglass (PMMA) may be used as the material for light-conducting member 110, since it may be cost-effective and easy to process. Since, however, transparency may be required only in the range of the transmitter light, another plastic may also be conceivable. A light-conducting member material may also be suitable which may have, for example by the use of a chemical or physical method, softer and more elastic properties on the side facing pane 11 than on the side facing away from pane 11, since in that way coupling medium 19 may be saved.

To achieve the filtering properties of light-conducting member 110, certain substances, in particular soot particles, may be added to the material during the production process of light-conducting member 110, in a spatially selective manner. Thus, for example, only the regions required for functioning may be permeable to transmitter light 117. An analogous procedure may also be possible for coupling medium 19.

In further variants, a transmitter 114 and a receiver 115 may be placed at each corner point of the trapezium or only one transmitter 114 may be used for the whole trapezium. Optical elements 116 may then have reflecting properties so as to be able, in spite of that, to couple in transmitter light 117 into pane 11 at several corner points of the trapezium.

It may also make sense to provide special heating for integrated light-conducting member 18, 110, in order to heat the measured path and/or light-conducting member 18, 110. This heating item may, for instance, be positioned on the light-conducting member as a heating element, or it may be realized by heating filaments, heating wires, or the like, integrated into light-conducting member 18 and/or 110. This may not be a problem if light-conducting member 18, 110 is formed homogeneously. However, if various plastics are used, for example, in a multi-component injection molding process, the expansion coefficients of the various plastics may be appropriately selected to avoid stresses or even cracks in light-conducting member 18, 110. For this, one may also resort to other measures, such as an advantageous positioning of the heating elements or heating wires.

What is claimed is:

1. A light-sensitive sensor unit, comprising:
   at least two light-sensitive sensors, each of the at least two light-sensitive sensors assigned a plurality of light-conducting elements, the plurality of light-conducting elements having a plurality of predeterminable receiving characteristics, at least a first light-sensitive sensor and a second light-sensitive sensor detecting a light condition in at least two predetermined directions;
   wherein the plurality of light-conducting elements assigned to the at least two light-sensitive sensors are connected as one piece to form a light-conducting member, the light-conducting member being integrated into a further light-conducting member of a rain sensor unit.

2. The sensor unit as recited in claim 1, wherein at least three light-sensitive sensors detect light from the at least two predetermined directions.

3. The sensor unit as recited in claim 1, wherein at least one light-sensitive sensor is aligned in a predetermined driving direction of a vehicle.

4. The sensor unit as recited in claim 1, wherein at least one light-sensitive sensor detects a light condition in a predetermined angle $\alpha$ direction, the predetermined angle $\alpha$ direction defining an angle $\alpha$ with a straight line in a driving direction of a vehicle.

5. The sensor unit as recited in claim 4, wherein two light-sensitive sensors define the angle $\alpha$ with each side of the straight line in the driving direction of the vehicle, each of the two light-sensitive sensors including a common light-sensitive sensor element.

6. The sensor unit as recited in claim 1, wherein the light-conducting elements are integrally formed.

7. The sensor unit as recited in claim 1, wherein light detecting cones of the light-conducting elements overlap.

8. The sensor unit as recited in claim 1, further comprising an evaluating device, the evaluating device able to distinguish between daylight and artificial light.

9. The sensor unit as recited in claim 1, wherein the light-conducting member is produced by a multi-component injection molding process.

10. The sensor unit as recited in claim 9, wherein a plurality of components of the multi-component injection molding process are adjusted with respect to a plurality of heat expansion coefficients of the plurality of components.

11. The sensor unit as recited in claim 1, wherein the rain sensor unit includes:
at least one transmitter;
at least one receiver; and
at least one light-conducting member between a pane and one of the at least one transmitter and the at least one receiver;
wherein at least one image of the at least one transmitter and the at least one receiver forms by projection onto the pane at least one corner point of a trapezium.

12. The sensor unit as recited in claim 11, further comprising at least one sensor element, the at least one sensor element able to distinguish between daylight and artificial light.

13. The sensor unit as recited in claim 11, wherein between the at least one transmitter and the at least one receiver, radiation is reflected at least once at a surface of the pane, the at least one transmitter emitting radiation in various directions, and at least one reflection surface created thereby establishing an at least approximately coherent sensitive surface.

14. The sensor unit as recited in claim 11, wherein the at least one transmitter emits radiation in two directions to two of the at least one receiver.

15. The sensor unit as recited in claim 11, wherein the at least one receiver receives radiation from two directions from two of the at least one transmitter.

16. The sensor unit as recited in claim 11, wherein:
the at least one transmitter includes two transmitters; and
the at least one receiver includes two receivers.

17. The sensor unit as recited in claim 16, wherein the trapezium includes a symmetrical trapezium, and wherein one of:
a first distance between the two receivers is about double a second distance between the two transmitters; and
the second distance is about double the first distance.

18. The sensor unit as recited in claim 17, wherein:
the two transmitters are positioned on a first, lower parallel in an installation position of the trapezium; and
the two receivers are positioned on a second, upper parallel in the installation position of the trapezium.

19. The sensor unit as recited in claim 11, wherein the rain sensor unit includes four measuring paths.

20. The sensor unit as recited in claim 11, wherein at least two centers of at least two reflection surfaces of at least two radiation cones of at least two of the at least one transmitter are positioned next to one another on the pane and spaced apart at an at least approximately equal distance.

21. The sensor unit as recited in claim 20, wherein the at least two centers are positioned on a line that lies between two parallels of the trapezium.

22. The sensor unit as recited in claim 11, wherein the at least one light-conducting member, the at least one transmitter, and the at least one receiver are designed and positioned so that only one single total reflection of a transmitter light appears on the pane.

23. The sensor unit as recited in claim 11, wherein allocated to each transmitter and receiver on the at least one light-conducting member is an optical element, the optical element including a plurality of separate lenses.

24. The sensor unit as recited in claim 23, wherein the plurality of separate lenses are integrally formed.

25. The sensor unit as recited in claim 23, wherein the plurality of separate lenses is two separate lenses.

26. The sensor unit as recited in claim 11, wherein:
an optical element having a single lens is allocated to each of the at least one transmitter on the at least one light-conducting member, and
an optical element having a single lens is allocated each of the at least one receiver on the at least one light-conducting member.

27. The sensor unit as recited in claim 1, wherein the first light-sensitive sensor detects a global ambient light.

28. The sensor unit as recited in claim 1, wherein the sensor unit includes a heating device for heating the light-conducting member.

29. The sensor unit as recited in claim 28, wherein the heating device includes a heating element which is one of:
in contact with the light-conducting member; and
integrated into the light-conducting member.

30. The sensor unit as recited in claim 1, wherein the sensor unit is for an automatic switching of illuminating equipment.

31. The sensor unit as recited in claim 30, wherein the sensor unit is for a motor vehicle.

32. The sensor unit as recited in claim 1, wherein the light-conducting member is integrated in one piece.

33. The sensor unit as recited in claim 32, wherein the light-conducting member is produced together with the further light-conducting member of the rain sensor unit and a coupling medium.

* * * * *